Sept. 20, 1938.  R. N. NIEDHAMMER  2,130,397
JUICE CATCHER FOR FOOD GRINDERS
Filed July 28, 1937
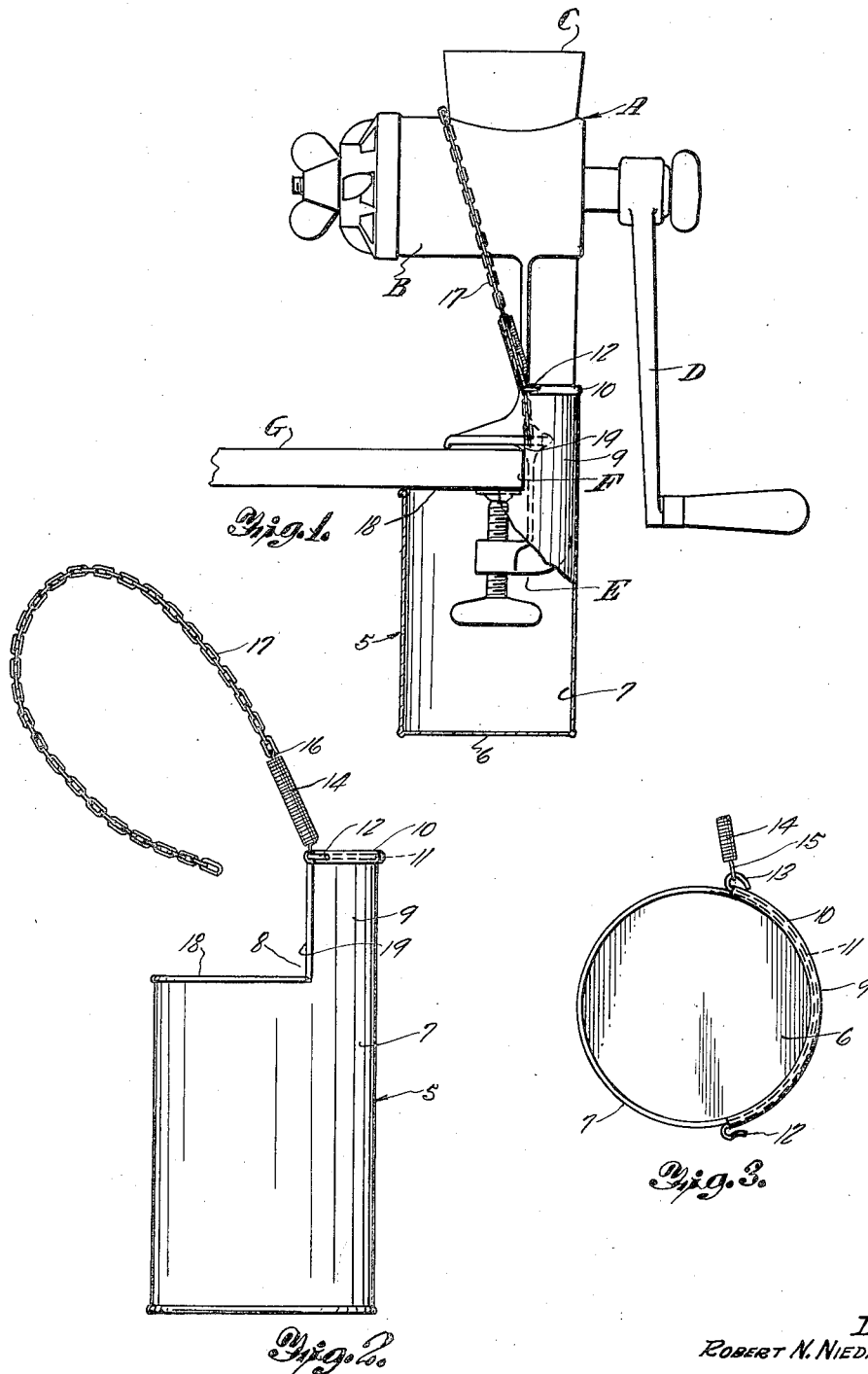
Inventor
ROBERT N. NIEDHAMMER
By Adam E. Fisher
ATTORNEY Patented Sept. 20, 1938

2,130,397

UNITED STATES PATENT OFFICE 2,130,397

JUICE CATCHER FOR FOOD GRINDERS

Robert N. Niedhammer, Fort Wayne, Ind.

Application July 28, 1937, Serial No. 156,081

2 Claims. (Cl. 146—182)

My invention relates to improvements in drip cups or juice catchers for food grinders.

In the use of the common food grinder especially for grinding and crushing the juicier foods such as fruits it is a prevalent and unsatisfactory thing for a part of the juice to escape thru the handle end of the grinder and drip to the floor.

My invention therefore provides a cup or receptacle which may be readily and conveniently hung beneath the handle end of the grinder in such manner as to catch this juice for use and to prevent its falling to the floor.

Another object is to provide a device of this kind comprising a cup or cup-like receptacle cut away at its upper end portion to provide an upstanding arcuate back portion adapted to contact the edge of the table supporting the grinder and this back carrying an eye and hook by which a chain and spring may be attached and passed over the grinder to support the cup in place.

With these and other objects in view the invention resides in the novel construction and arrangement of parts as hereinafter fully set forth and claimed, reference being had to the accompanying drawing wherein:

Figure 1 is a side view of a grinder as equipped or provided with my invention, a portion of the cup being shown in section.

Figure 2 is an enlarged side view of the cup and its fastening chain and spring.

Figure 3 is a plan view.

Referring now with more particularity to the drawing my invention comprises a cup or cup-like receptacle 5 having a bottom 6 and annular wall 7 with a water tight joint between. An upper portion of the wall 7 is cut out as at 8 leaving an upstanding back or rest 9 of arcuate cross section the upper extremity of which is rolled as at 10 around a wire 11 which extends outwardly at its ends. A hook 12 is formed at one end of this wire 11 and an eye 13 is formed at the other end. A small retractile coil spring 14 is attached at one end 15 to the eye 13 and at its other end is attached at 16 to a length of chain 17 the links of which are of such size that they may any one be hooked over the said hook 12.

A conventional form of food grinder is indicated at A comprising the cylinder B, hopper C, handle D and clamp E by which the grinder is attached to the edge F of the table G. In the use of this form of grinder particularly in grinding juicy foods it is common for some of the juice to emerge at the handle end of the cylinder B and run down over the clamp E to the floor. My invention is applied to the grinder by placing the cup 5 beneath the table G up over the lower parts of the clamp E and with the back 9 extended up along the clamp against the table edge F. The chain 17 is then passed over the cylinder B forward of the hopper C and pulled tight so as to expand the spring 14 and the chain is then hooked over the hook 12. The tension of the spring 14 then holds the cup up securely under the table. The juices will then run down the inside of the back 9 into the cup 5 wherein they will collect for removal as necessary. It will be noted that the contiguous upper margin 18 of the cup proper and the vertical lateral margins or edges 19 of the back 9 form a right angled opening into which the table edge will nicely fit thus both preventing the escape of juices laterally out the side of the receptacle and forming a "catch" or bearing against which the spring 14 may pull to securely hold the cup in place. It is but a moment's work to attach or detach the cup from the grinder and it interferes in no way with the usual attachment of the grinder to the table.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In combination with a grinder including a cylinder as set up on the edge of the table, a cup having a notch in its upper portion to receive the edge of the table, and including an upstanding back for engaging the table edge and a chain and spring connected to opposite ends of the said back and adapted to be passed over the said cylinder of the grinder to pull the cup upward tight against the table edge.

2. In a device of the kind described, a cup having an upper portion cut away to form a right angled notch and an upstanding back, a wire rolled in the upper margin of the back, an eye formed at one end of the wire and a hook at the other, a retractile coil spring attached to the eye and a chain attached to the spring and adapted to engage the said hook.

ROBERT N. NIEDHAMMER.